US011975587B2

(12) United States Patent
Frank et al.

(10) Patent No.: US 11,975,587 B2
(45) Date of Patent: May 7, 2024

(54) METHOD FOR OPERATING A PRESSURE-REGULATING SYSTEM IN A VEHICLE AND PRESSURE-REGULATING SYSTEM

(71) Applicant: WABCO GmbH, Hannover (DE)

(72) Inventors: Dieter Frank, Hannover (DE); Joerg Scharpenberg, Burgwedel (DE); Uwe Stabenow, Laatzen (DE)

(73) Assignee: ZF CV SYSTEMS EUROPE BV, Brussels (BE)

( * ) Notice: Subject to any disclaimer, the term of this patent is extended or adjusted under 35 U.S.C. 154(b) by 1223 days.

(21) Appl. No.: 16/610,082

(22) PCT Filed: Apr. 12, 2018

(86) PCT No.: PCT/EP2018/059407
§ 371 (c)(1),
(2) Date: Nov. 1, 2019

(87) PCT Pub. No.: WO2018/202399
PCT Pub. Date: Nov. 8, 2018

(65) Prior Publication Data
US 2023/0101840 A1    Mar. 30, 2023

(30) Foreign Application Priority Data

May 5, 2017   (DE) .................. 10 2017 004 338

(51) Int. Cl.
*B60G 17/052*   (2006.01)
*B60G 17/015*   (2006.01)
*B60G 17/056*   (2006.01)

(52) U.S. Cl.
CPC ..... *B60G 17/0528* (2013.01); *B60G 17/0155* (2013.01); *B60G 17/056* (2013.01);
(Continued)

(58) Field of Classification Search
CPC ........... B60G 17/0528; B60G 17/0155; B60G 17/056; B60G 2202/152; B60G 2500/204; B60G 2500/205; F16K 31/1262
See application file for complete search history.

(56) References Cited

U.S. PATENT DOCUMENTS

| 4,825,839 A | 5/1989 | Mehnert |
| 2004/0228737 A1 | 11/2004 | Folchert |

(Continued)

FOREIGN PATENT DOCUMENTS

| DE | 3611171 C2 | 5/1988 |
| DE | 10226124 A1 | 8/2003 |

(Continued)

*Primary Examiner* — Daphne M Barry
(74) *Attorney, Agent, or Firm* — LEYDIG, VOIT & MAYER, LTD.

(57) ABSTRACT

A method for operating a pressure control system in a vehicle includes controlling a flow-control valve in a charging line, which conveys a charging pressure medium, in dependence upon an admission pressure and/or upon an admission volume flow. The admission pressure and/or the admission volume flow characterizes a prevailing or currently to be expected loading of a pneumatic consumer of the pressure control system during the supply of the charging pressure medium with a charging volume flow and at a charging pressure into the pneumatic consumer. The method further includes adjusting a flow-control cross-section, which acts on the charging pressure medium as it flows through the flow-control valve, or adjusting an average flow-control cross-section so as to limit the charging volume flow to a limit volume flow. The method additionally includes outputting the volume-flow limited charging pressure medium to the pneumatic consumer.

8 Claims, 9 Drawing Sheets

(52) U.S. Cl.
CPC .. *B60G 2202/152* (2013.01); *B60G 2500/204* (2013.01); *B60G 2500/205* (2013.01)

(56) References Cited

U.S. PATENT DOCUMENTS

| | | | |
|---|---|---|---|
| 2010/0092821 A1* | 4/2010 | Takeshita | H01M 8/04089 137/488 |
| 2013/0255240 A1 | 10/2013 | Bergemann | |
| 2013/0320645 A1 | 12/2013 | Gall | |
| 2014/0059876 A1 | 3/2014 | Folchert et al. | |
| 2014/0241859 A1* | 8/2014 | Hein | B60G 17/0528 415/115 |

FOREIGN PATENT DOCUMENTS

| | | |
|---|---|---|
| DE | 10321771 A1 | 12/2004 |
| DE | 102011083614 A1 | 9/2012 |
| DE | 102011084921 A1 | 4/2013 |
| DE | 102012005303 A1 | 6/2013 |
| DE | 102012006382 A1 | 10/2013 |
| DE | 102012010390 A1 | 12/2013 |
| DE | 102008034240 B4 | 12/2014 |

* cited by examiner

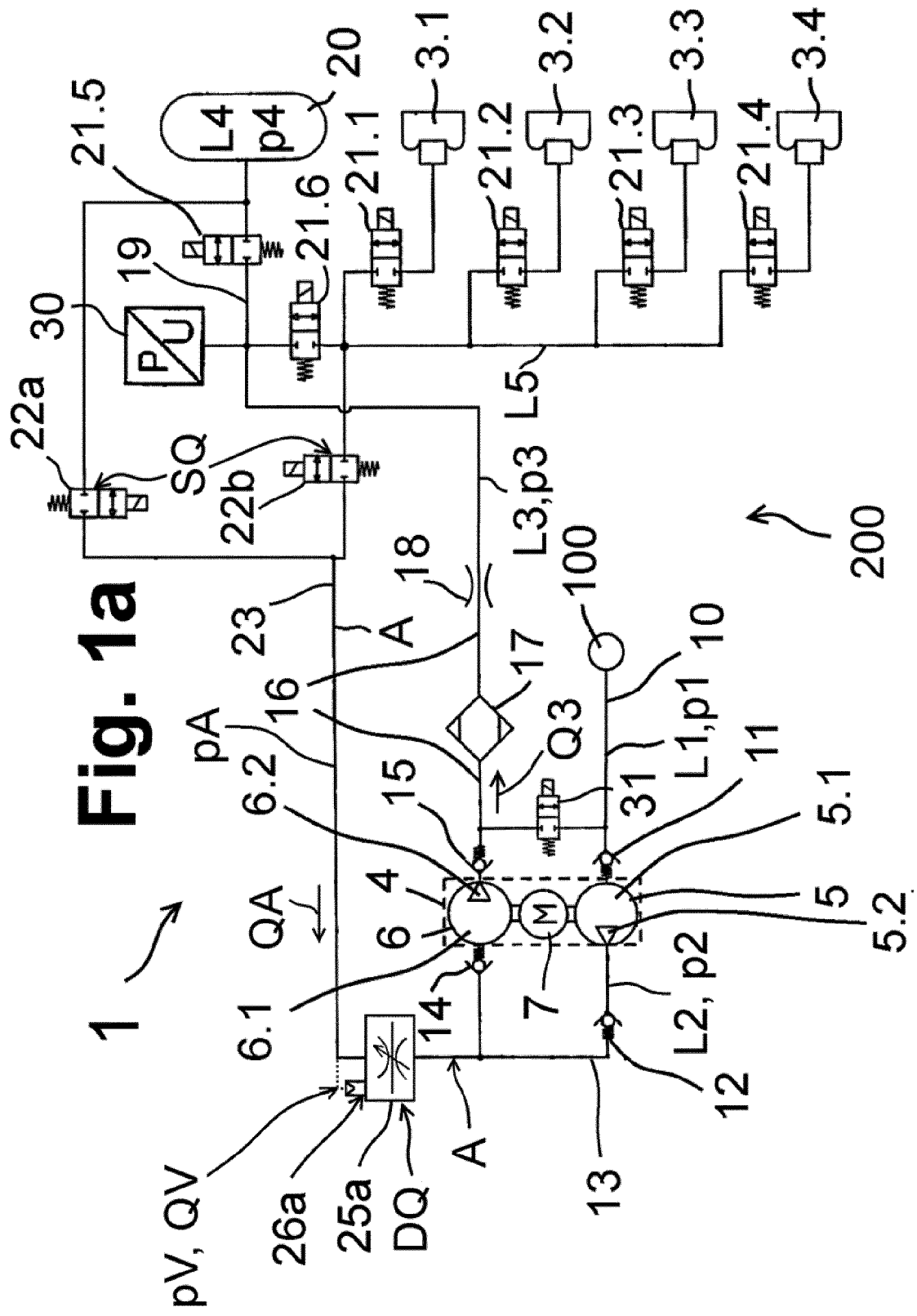

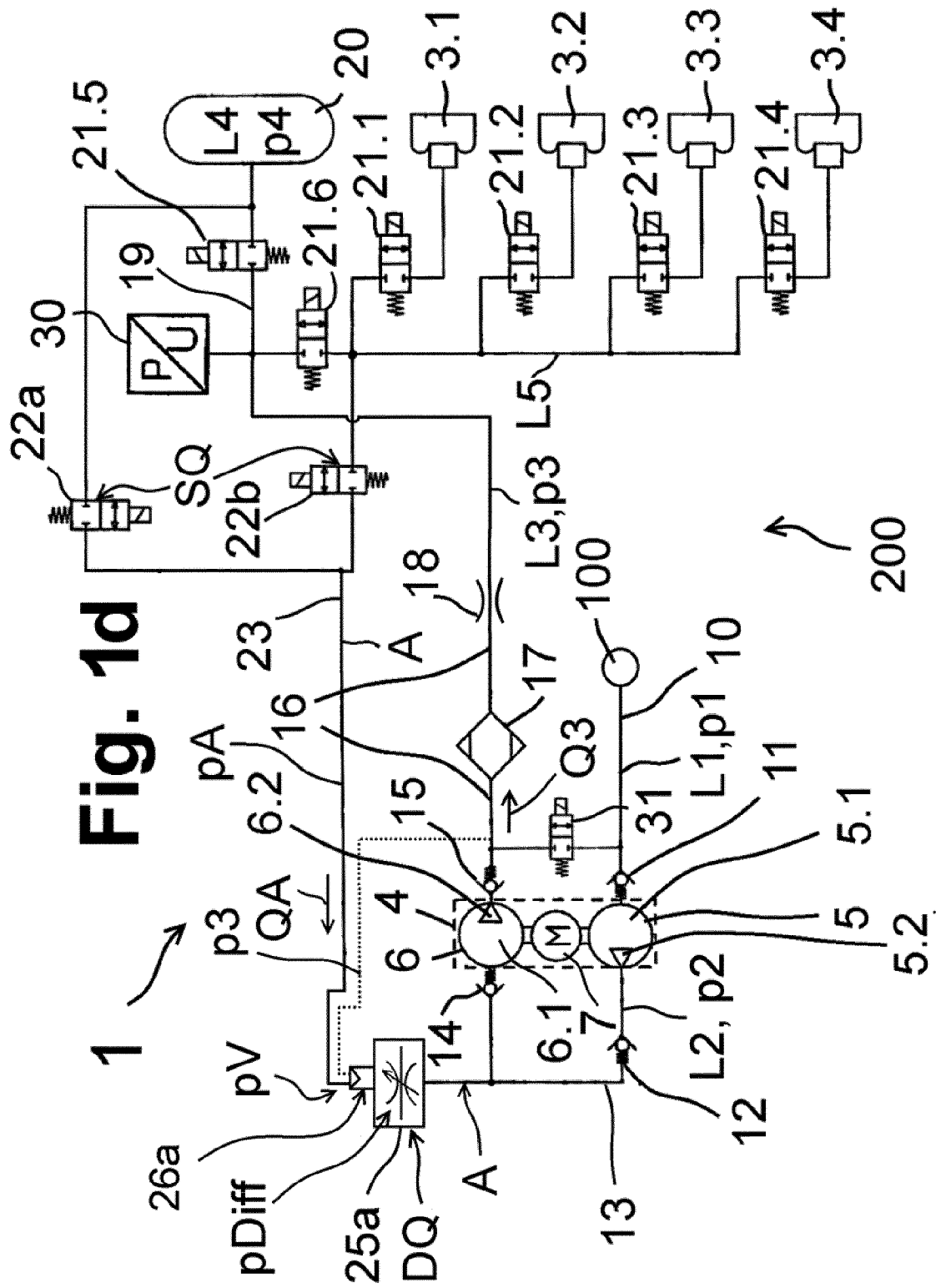

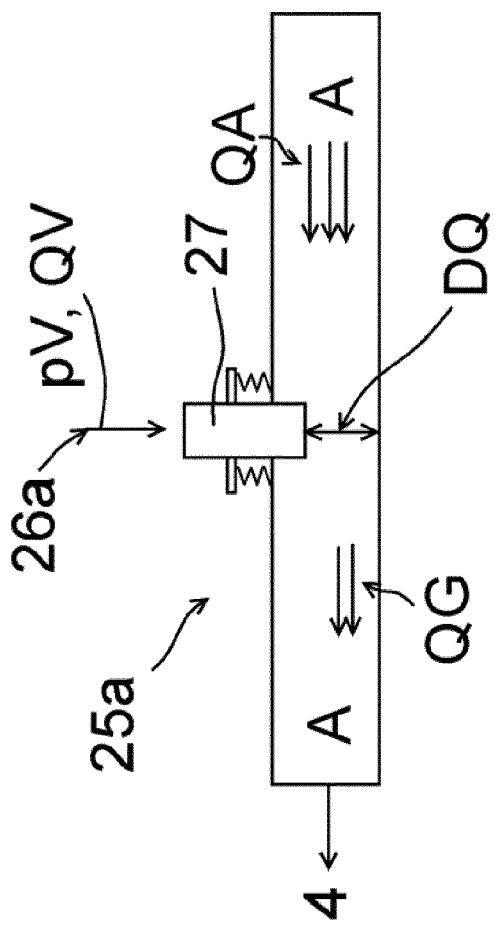

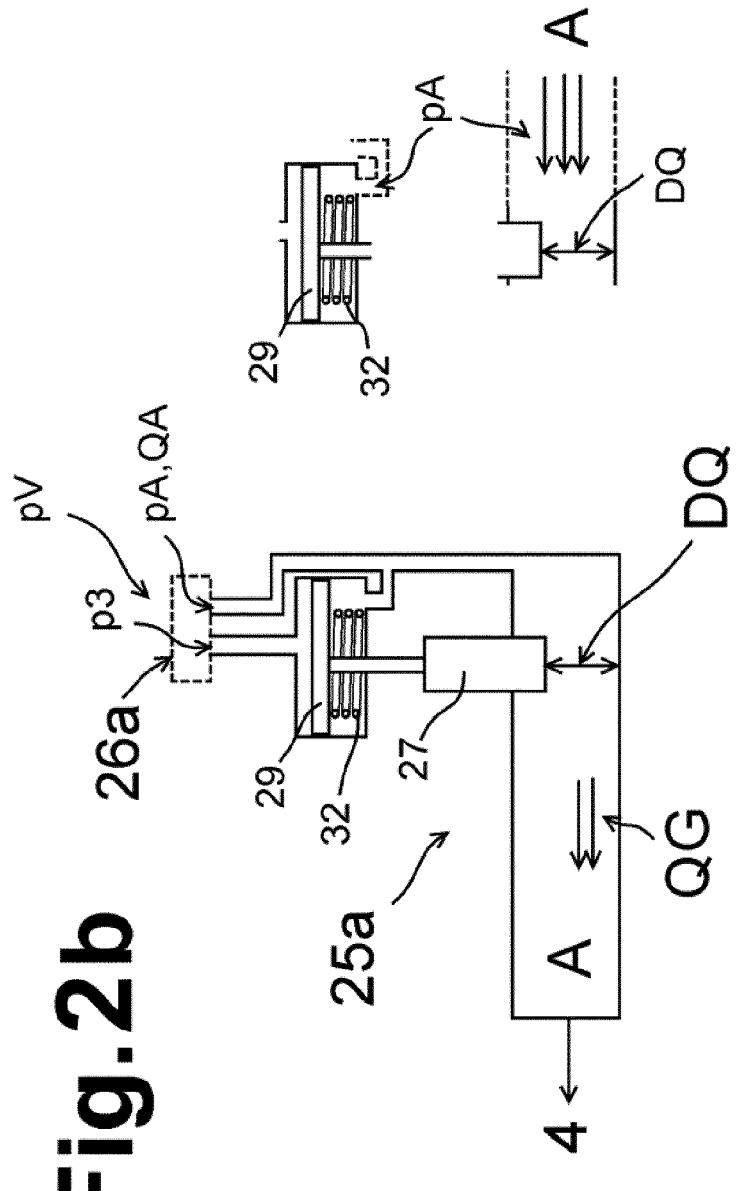

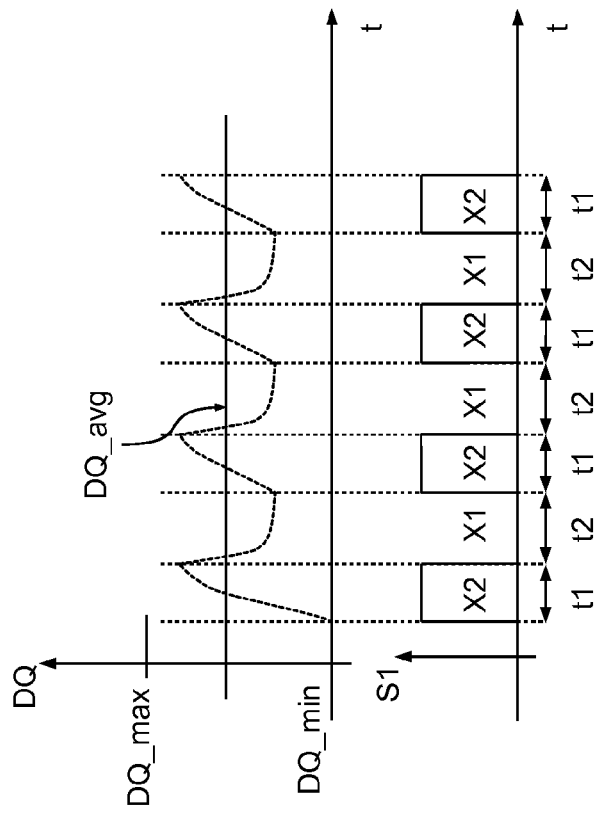

METHOD FOR OPERATING A PRESSURE-REGULATING SYSTEM IN A VEHICLE AND PRESSURE-REGULATING SYSTEM

CROSS REFERENCE TO RELATED APPLICATIONS

This application is a U.S. National Phase application under 35 U.S.C. § 371 of International Application No. PCT/EP2018/059407, filed on Apr. 12, 2018, and claims benefit to German Patent Application No. DE 10 2017 004 338.8, filed on May 5, 2017. The International Application was published in German on Nov. 8, 2018 as WO 2018/202399 under PCT Article 21(2).

FIELD

The invention relates to a method for operating a pressure control system, in particular an air spring system in a vehicle, and also to a pressure control system for implementing the method.

BACKGROUND

Multi-stage compressors are used so as to realize a high degree of compression of a pressure medium, in particular of a gas, by way of example air, by virtue of the fact that the pressure medium that is pre-compressed in a first compression stage is additionally compressed in a subsequent second compression stage. It is also possible to provide further compression stages in a cascade, in which respectively the pressure medium that is compressed by the preceding compression stage is further compressed.

If consumers by way of example of an air spring system or of a level control system in a vehicle are supplied with the pressure medium, a multi-stage compressor of this type may be used in order to provide the pressure medium with the appropriate pressure for supplying compression springs. In this case, the multi-stage compressor compresses the pressure medium that is directed from the atmosphere into an intake chamber via two or multiple compression stages and conveys the multi-stage compressed pressure medium to the compression springs. Alternatively, it is also possible to use a pressure medium that has already been compressed from a pressure medium storage device, said pressure medium being compressed once more by means of the multi-stage compressor.

This is described by way of example in DE 10 2008 034 240 B4, according to which a level control system is provided in which a multi-stage compressor is used in order to convey pressure medium from the atmosphere or from a pressure medium storage device, wherein two compression stages are provided. If pressure medium from the atmosphere is compressed, the pressure medium is directed through the two compression stages, whereas when the pressure medium is conveyed from the pressure medium storage device, the pressure medium that is supplied to the consumer is only compressed using the second compression stage. In order in this case to reduce or to block the compression work of the first compression stage, a stop valve that is configured as a 2/2-way control valve is provided that in the event that pressure medium is conveyed from the pressure medium storage device prevents compressed pressure medium from being conveyed from the first compression stage to the second compression stage. In so doing, the stop valve is electrically controlled via a control unit.

DE 103 21 771 A1 describes a multi-stage compressor, in which so as to switch off the first compression stage, a bypass line having a pneumatically controllable stop valve is provided, said bypass line connecting an intake chamber of the compressor to the first compression chamber. In so doing, the pneumatic stop valve is opened in dependence upon the pressure in the intake chamber with the result that pressure compensation occurs between the intake chamber and the compression chamber. This renders it possible to switch off the first compression stage in dependence upon the pressure of the pressure medium that is admitted into the intake chamber. As a consequence, it is possible in dependence upon the admitted pressure medium in the single-stage operation to realize a high degree of compression in the case of a low volume flow. In contrast, it is possible in the two-stage operation to realize a high volume flow and the pressure medium flows through two compression stages.

It is provided in accordance with DE 10 2011 083 614 A1 in an open operating mode to compress air by means of two compression stages and to convey the compressed air to a pressure medium storage device. In a closed operating mode, the already compressed air may be admitted from the pressure medium storage device into an intermediate volume between the first and the second compression stage and compressed again by means of one of the compression stages, in order subsequently to pass into the consumer. Furthermore, it is also provided to return air from the consumers into the pressure medium storage device. For control purposes, electrically actuated switching valves are provided that block and release the flow according to the flow paths for the compressed air or for the air that is to be compressed.

DE 10 2012 010 390 A1 describes a level control system, in which in a closed operating mode air that has already been compressed via a compressor is supplied from a pressure storage device to consumers that are configured as suspension struts. In order to control the pressure in the level control system, a pressure limiting function is provided that is configured either in the form of a discharge valve or in the form of a pilot valve, which respectively discharge air into the atmosphere when the pressure in the system is excessively high.

SUMMARY

In an embodiment, the present invention provides a method for operating a pressure control system in a vehicle. The method includes controlling a flow-control valve in a charging line, which conveys a charging pressure medium, in dependence upon an admission pressure and/or upon an admission volume flow. The admission pressure and/or the admission volume flow characterizes a prevailing or currently to be expected loading of a pneumatic consumer of the pressure control system during the supply of the charging pressure medium with a charging volume flow and at a charging pressure into the pneumatic consumer. The method further includes adjusting a flow-control cross-section, which acts on the charging pressure medium as it flows through the flow-control valve, or adjusting an average flow-control cross-section so as to limit the charging volume flow to a limit volume flow. The flow-control cross-section or the average flow-control cross-section is adjusted in a continuously variable manner in dependence upon the admission pressure and/or upon the admission volume flow.

The method additionally includes outputting the volume-flow limited charging pressure medium to the pneumatic consumer.

BRIEF DESCRIPTION OF THE DRAWINGS

The present invention will be described in even greater detail below based on the exemplary figures. The invention is not limited to the exemplary embodiments. All features described and/or illustrated herein can be used alone or combined in different combinations in embodiments of the invention. The features and advantages of various embodiments of the present invention will become apparent by reading the following detailed description with reference to the attached drawings which illustrate the following:

FIGS. 2a, and b illustrate detailed views of a pneumatically controllable flow-control valve in different embodiments;

FIG. 3 illustrates a pulse-width modulated control of the electrically controllable flow-control valve.

DETAILED DESCRIPTION

Figure 1B:
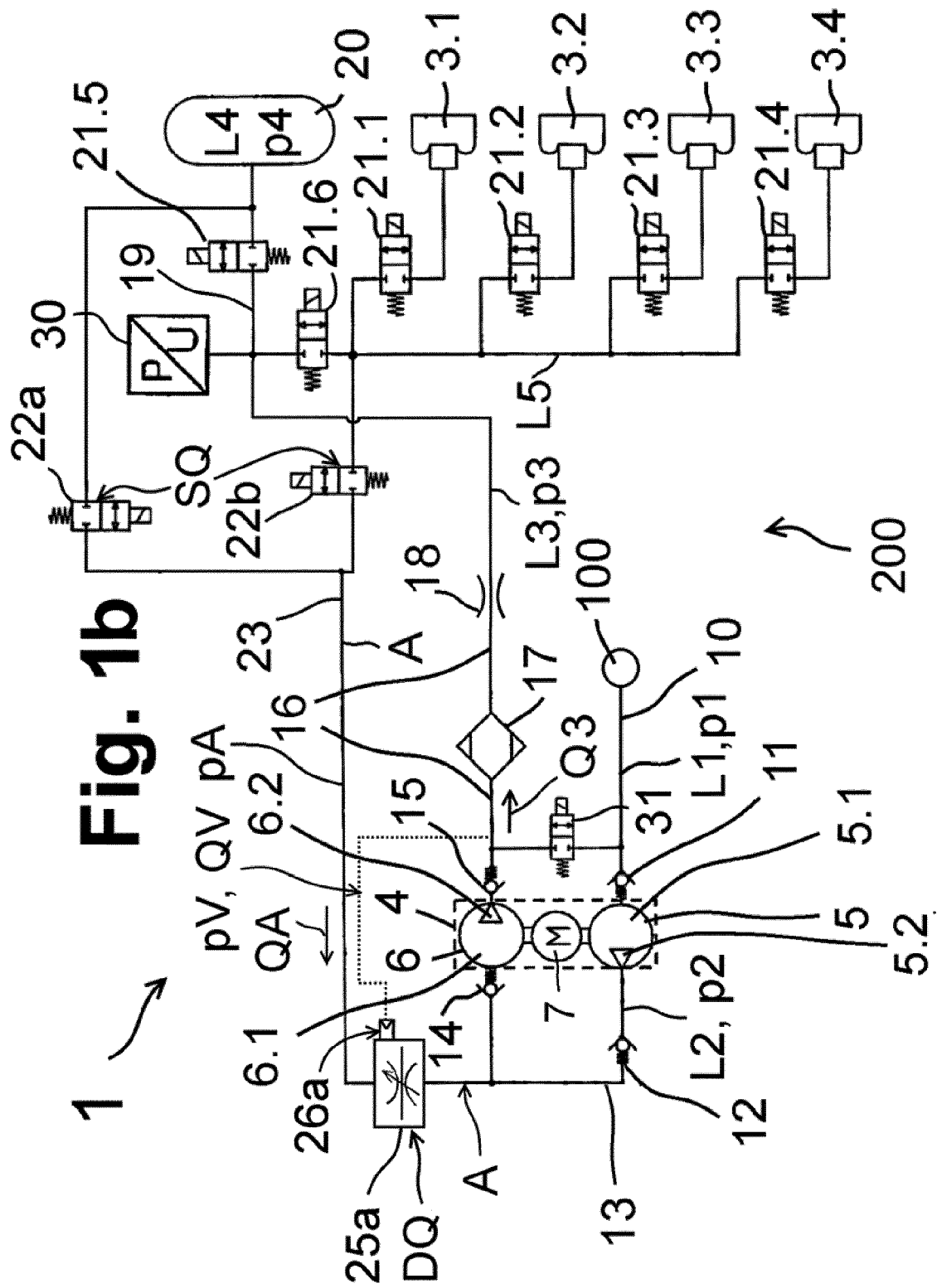
FIGS. 1a, b, c, and d illustrate an air spring system having a two-stage compressor having a pneumatically controllable flow-control valve.
FIG. 1e illustrates an air spring system having a two-stage compressor having an electrically controllable flow-control valve.

The invention proposes methods with which a pressure control system in a vehicle, in particular in a passenger car, may be operated with a high degree of reliability. Furthermore, the invention proposes pressure control systems for implementing such methods.

In accordance with the invention, it is accordingly recognized to avoid an overloading of a pressure control system, in particular an air spring system in a vehicle, by virtue of the fact that a power consumption of a pneumatic consumer of the pressure control system, in particular of a single-stage or multi-stage compressor, is adjusted during the operation, in that a charging volume flow of a charging pressure medium that is supplied to the pneumatic consumer is adjusted, wherein the adjustment may be performed in a continuously variable manner. This can be achieved in accordance with the invention by virtue of the fact that, in dependence upon an admission pressure and/or upon an admission volume flow, which respectively characterize the power consumption during the operation of the pneumatic consumer, the charging volume flow is limited or restricted in a continuously variable manner, in that a flow-control cross-section or average flow-control cross-section that acts on the charging pressure medium that is supplied to the pneumatic consumer is adjusted in a continuously variable manner.

As a consequence, it is possible to advantageously realize that in a closed operating mode of the pressure control system, in which the already compressed charging pressure medium from a pressure medium storage device or pressure medium chambers of by way of example air springs is compressed again, the single-stage or multi-stage compressor is not overloaded as a pneumatic consumer, wherein an overloading may arise in particular as a result of an excessively high in-flowing charging volume flow or charging pressure of the charging pressure medium that is to be compressed again. An overloading may occur by way of example by virtue of the fact that in the case of an excessively high charging volume flow an excessively high torque is required by a motor that drives the compression stages of the single-stage or multi-stage compressor and as a consequence a required current increases beyond a current limit of by way of example 35A. In order to avoid this and to be able to operate the single-stage or multi-stage compressor just below its power limit, a continuously variable flow-control of the charging volume flow is performed in advance.

As a measure for a prevailing or a currently to be expected loading of the single-stage or multi-stage compressor as a pneumatic consumer, it is possible to use as an admission pressure or rather admission volume flow either the charging pressure or rather the charging volume flow of the charging pressure medium that is to be compressed again or else to use a compression pressure or rather a compression volume flow of a compressed pressure medium that is discharged from the single-stage or multi-stage compressor after being compressed again. Furthermore, it is also possible to use as a measure for a prevailing loading of the single-stage or multi-stage compressor a difference between the charging pressure and the compression pressure, in other words the pressure difference between the pressure medium that is flowing into the single-stage or multi-stage compressor and the pressure medium that is flowing out of the single-stage or multi-stage compressor after being compressed again. The flow control procedure may therefore be performed in dependence upon this difference pressure.

In so doing, it is possible to control the extent of the flow-control in an electrical or pneumatic manner. For this purpose, an electrically or pneumatically controllable flow-control valve is provided that is arranged in a charging line, via which, in a closed operating mode of the pressure control system, a charging pressure medium that has already been compressed is conveyed with the charging volume flow into any one compression stage of the single-stage or multi-stage compressor to be compressed again.

If in accordance with one embodiment a pneumatic flow-control valve is used in the charging line, a pneumatic control input of the pneumatic flow-control valve is controlled with the corresponding admission pressure or rather admission volume flow, in that either the charging pressure medium and/or the compression pressure medium or a difference pressure that is generated in a difference pressure controller that is connected upstream of the pneumatic control input is supplied. Alternatively, the pneumatic flow-control valve may also determine the difference pressure itself, in that both the charging pressure medium and also the compression pressure medium is supplied to the pneumatic flow-control valve and the pneumatic flow-control valve adjusts the flow-control cross-section in dependence upon the difference in pressure between the two.

In dependence upon the magnitude of the admission pressure or admission volume flow at the pneumatic control input, the flow-control cross-section in the pneumatic flow-control valve is subsequently adjusted in a continuously variable manner, said flow-control cross-section acting upon the charging pressure medium that is flowing in via the charging line. In dependence upon the flow-control cross-section, it is consequently possible to limit the charging volume flow to a limit volume flow, wherein for this purpose the limit volume flow is selected by virtue of a continuously variable adjustment of the flow-control cross-section in dependence upon which volume flow the single-stage or multi-stage compressor is to be subjected to a maximum in the prevailing operating mode without said compressor being overloaded in particular by an excessively high energy consumption with the result that the single-stage or multi-stage compressor operates just below its power limit.

It is consequently advantageously realized that it is possible using simple means to avoid an overloading in the operation of the pressure control system. This may be used to optimize the single-stage or multi-stage compressor with the result that it is possible to optimize the adjustment in particular of the compression volume flow from the second or last compression stage. The invention can allow for the single-stage or multi-stage compressor to be operated close to the power limit by means of using the flow-control valve, wherein for this purpose in an optimum manner a continuously variable adjustment of the flow-control cross-section and consequently of the limit volume flow is desired.

Since in an open operating mode, charging pressure medium does not flow through the charging line and therefore the power consumption of the single-stage or multi-stage compressor is not adjusted, the flow-control procedure does not have any influence on the normal operation of the pressure control system. The reason for this is that the flow-control procedure only influences the closed operating mode and only does so if the single-stage or multi-state compressor is operated above the power limit.

In accordance with an alternative embodiment, an electrically controllable flow-control valve is provided that is configured by way of example as a 2/2-way valve and that may be transferred into two switching positons via an electrical control input. For this purpose, a control signal that is generated by a control unit is transmitted to the electrically controlled input, wherein the control signal in this case is generated in dependence upon the admission pressure—in other words upon the charging pressure, upon the compression pressure or upon the difference pressure—and/or upon the admission volume flow—in other words upon the charging volume flow or upon the compression volume flow. For this purpose, the control unit measures the corresponding pressure/pressures or rather the corresponding volume flow/volume flows by way of example using sensors.

In so doing, the switching positions determine a maximum flow-control cross-section and a minimum flow-control cross-section: in a first switching position, the electrical flow-control valve is by way of example fully closed with the result that a minimum flow-control cross-section of 0 mm is set since the electrical flow-control valve completely prevents a through-flow of the charging pressure medium. In a second switching position, the electrical flow-control valve is fully open, as a result of which a maximum flow-control cross-section of by way of example between 1 mm and 4 mm is set. Consequently, this maximum flow-control cross-section acts on the in-flowing charging pressure medium, said maximum flow-control cross-section ensuring the charging volume flow is limited to a specific limit volume flow.

In order to also realize a continuously variable adjustment of the limit volume flow using these two switching positions, the electrical flow-control valve may be controlled via a pulse-width modulated signal. This ensures that the electrical flow-control valve is switched in an alternating manner between the first and the second switching position, wherein as a consequence the flow-control cross-section also changes over time. In dependence upon the switching behavior, an average flow-control cross-section is created in the middle, said average flow-control cross-section acting on the in-flowing charging pressure medium, wherein the average flow-control cross-section may be adjusted in a continuously variable manner by means of correspondingly adjusting the control signal.

Consequently, it is also possible using the electrical flow-control valve to adjust the charging volume flow in a continuously variable manner, as a result of which it is possible to limit the power consumption of the single-stage or multi-stage compressor. The advantages that apply to the pneumatic flow-control valve may consequently also apply for the electrical flow-control valve.

The corresponding flow-control valve may advantageously be retrofitted in a simple and cost-efficient manner since the flow-control valve may be installed as a compact component in an existing pressure medium line, by way of example the charging line of the pressure control system, with an already existing switching valve that releases the compressed pressure medium, by way of example the charging pressure medium. It is consequently possible to keep the outlay low for retrofitting said flow-control valve.

In addition or as an alternative thereto, the already existing switching valve may also be used as an electrically controlled flow-control valve for releasing the charging pressure medium from the pressure medium storage device or from the pressure medium chambers. An additional flow-control valve may be used then as a backup or may be omitted. As soon as the pressure control system is switched into the closed operating mode, the corresponding volume flow-limited charging pressure medium is released by means of the pulse-width modulated control of the respective switching valve from the pressure medium storage device or from the pressure medium chambers to be compressed again.

Alternatively, it is also possible to omit the already existing switching valve and to use the electrical flow-control valve both for controlling the flow and also for releasing the respective charging pressure medium with the result that components may be omitted. This alternative solution may then be used if in the pressure control system a pressure medium is only drawn from the pressure medium storage device or from the pressure medium chambers since it is not possible to release charging pressure medium from two pressure sources independently using only one electrically controlled flow-control valve.

In accordance with FIGS. 1a to 1e respectively, a pressure control system 1, by way of example an air spring system, is provided that comprises four pressure medium chambers 3.1, 3.2, 3.3, 3.4 that are each allocated air springs of a vehicle 200. The pressure medium chambers 3.i are supplied with a compressed pressure medium L3 by way of air, wherein the compressed pressure medium L3 is compressed in a two-stage compressor 4. However, it is also possible to use a single-stage compressor or a compressor 4 having more than two stages.

The two-stage compressor 4 comprises for this purpose a first compression stage 5 and also a second compression stage 6, which respectively comprise an intake chamber 5.1, 6.1 and a compression chamber 5.2, 6.2, wherein the pressure medium L1, L2, A that is flowing into the respective intake chamber 5.1, 6.1 is compressed in the compression chamber 5.2, 6.2. The compression stages 5, 6 are driven by means of a motor 7 that causes a piston that is located in the respective compression stage 5, 6 to move upward and downward and as a consequence the pressure medium L1, L2, A that is provided in the intake chamber 5.1, 6.1 is compressed accordingly.

The pressure control system 1 may be operated in accordance with this embodiment in two operating modes: in an open operating mode BMo (open mode) and in a closed operation mode BMc (closed mode), in which respectively air is conveyed and compressed as pressure medium L1, L2, L3, L4, L5. In the open operating mode BMo, intake air L1 is directed from the atmosphere 100, in other words at an air pressure or intake pressure p1 of approx. 1 bar via an intake line 10 and also a first inlet valve 11 into the first intake chamber 5.1 of the first compression stage 5. Subsequently, the intake air L1 is initially pre-compressed and in so doing directed into the first compression chamber 5.2. The pre-compressed air L2 flows out of the first compression chamber 5.2 at an intermediate pressure p2 via a first outlet valve 12, by way of example a non-return valve into an intermediate volume 13.

The pre-compressed air L2 passes from the intermediate volume 13 via a second inlet valve 14 into the second intake chamber 6.1 of the second compression stage 6, in which the pre-compressed air L2 is further compressed and is directed into the second compression chamber 6.2. The compressed air L3 passes from the second compression stage 6 at a compression pressure p3 and also with a compression volume flow Q3 via a second outlet valve 15 into an outlet line 16 to an air dryer 17 and a nozzle 18. Subsequently, the outlet line 16 directs the compressed air L3 to the pressure medium chambers 3.1, 3.2, 3.3, 3.4 of the connected air springs and also via a supply line 19 to a pressure medium storage 20, in which the compressed air L3 is stored as stored air L4 at a storage pressure p4 that owing to losses is slightly less than the compression pressure p3.

The pressure medium storage device 20 and also the pressure medium chambers 3.1, 3.2, 3.3, 3.4 may be connected respectively to the outlet line 16 or rather to the supply line 19 by means of a controllable valve 21.1, 21.2, 21.3, 21.4, 21.5, 21.6, by way of example by means of a 2/2-way solenoid valve, with the result that depending upon the position of the controllable valves 21.i the compressed air L3 may flow into the pressure medium chambers 3.1, 3.2, 3.3, 3.4 so as to control the air springs or into the pressure medium storage device 20.

Accordingly, in the case of an open sixth valve 21.6 and a closed first valve 21.1, the compressed air L3 is directed into the first pressure medium chamber 3.1, in the case of an open second valve 21.2 said compressed air is directed into the second pressure medium chamber 3.2, in the case of an open third valve 21.3 said compressed air is directed into the third pressure medium chamber 3.3 and in the case of an open fourth valve 21.4 said compressed air is directed into the fourth pressure medium chamber 3.4, wherein the fifth valve 21.5 is subsequently closed and consequently it is not possible for compressed air L3 to flow into the pressure medium storage device 20.

If, on the other hand, the valves 21.1, 21.2, 21.3, 21.4, 21.6 are in the closed position and the fifth valve 21.5 is in the open position, it is possible for dried and compressed air L3 to be directed through the air dryer 17 into the pressure medium storage device 20 and stored therein. It is possible to monitor the pressure using a pressure measuring device 30. The compressed air L3 may be discharged into the atmosphere 100 via an additional discharge valve 31.

The air L4 that is stored in the pressure medium storage device 20 in the closed operating mode BMc as a charging pressure medium A may be directed into the intermediate volume 13 with the result that the already compressed stored air L4 is compressed again. For this purpose, the fifth valve 21.5 is closed in accordance with one embodiment and a first switching valve 22a is opened, said first switching valve being arranged in a charging line 23 that branches off between the fifth valve 21.5 and the pressure medium storage device 20. The charging line 23 is connected to the intermediate volume 13 with the result that when the first switching valve 22a is in the open position the stored air L4 may flow into the intermediate volume 13 and into the second intake chamber 6.1. Consequently the compressed, stored air L4 may be compressed again by the second compression stage 6. If more than two compression stages 5, 6 are provided in the compressor 4, the charging pressure medium A may also be directed via the charging line 23 into any other compression stage.

If in the closed operating mode BMc it is desired to return chamber air L5 from the pressure medium chambers 3.i into the pressure medium storage device 20, then the valve 21.i (where i=1 . . . 4), which is allocated to the respective pressure medium chamber 3.i, and also a second switching valve 22b are opened and the sixth valve 21.6 closed with the result that the chamber air L5 is directed as charging pressure medium A into the charging line 23. The first switching valve 22a is in this case likewise closed and the fifth valve 21.5 opened in order to render possible a flow back to the pressure medium storage device 20. If it is provided to compress the stored air L4 only once in the pressure control system 1, it is also possible to omit the path via the second switching valve 22b.

In order to control the power consumption of the multi-stage compressor 4 in the case of the repeated compression of the charging pressure medium A in the closed operating mode BMc, a pneumatically or electrically controllable flow control valve 25a, 25b is provided in the charging line 23, said flow-control valve being used to continuously variably adjust a charging volume flow QA of the charging pressure medium A, which is flowing in the charging line 23, and in so doing it is possible to limit the flow to a limit volume flow QG. In order to realize this continuously variable adjustment of the charging volume flow QA, a flow-control cross-section DQ of the flow-control valve 25a, 25b is adjusted in a continuously variable manner, wherein the flow-control cross-section DQ indicates an effective line cross-section of the respective flow-control valve 25a, 25b that acts on the charging pressure medium A as it flows through the respective flow-control valve 25a, 25b. FIGS. 1a to 1e illustrate embodiments of the flow-control valve 25a, 25b, which differ from one another in particular in the manner in which they are controlled.

In all the embodiments, it is initially provided that the charging pressure medium A is supplied at the charging pressure pA and with the charging volume flow QA to the respective flow-control valve 25a, 25b via the charging line 23. The flow-control valve 25a, 25b is connected via the charging line 23 to the two switching valves 22a, 22b that each comprise a switching valve cross-section SQ of between 1 mm and 4 mm and in the case of alternatively open switching valves 22a, 22b the charging volume flow QA is limited in advance via said switching valves since, on account of the switching valve cross-section SQ, the switching valves 22a, 22b only allow a limited volume flow to pass. The switching valves 22a, 22b are electronically controlled and as a consequence one of the switching valves 22a, 22b is opened as soon as it is electrically requested to change into the closed operating mode BMc, in which the stored air L4 or the chamber air L5 is released as charging pressure medium A into the charging line 23.

Figure 1C:
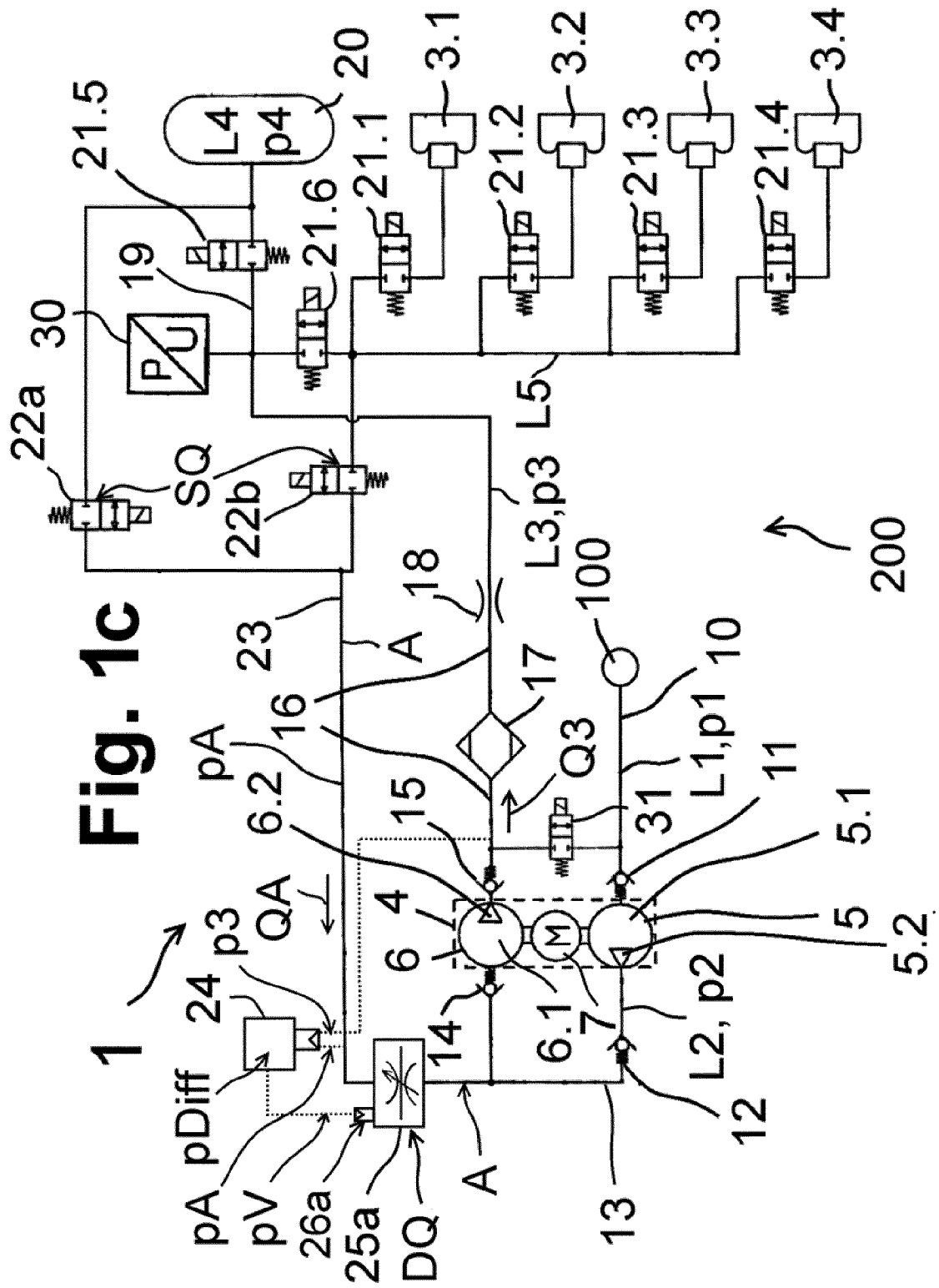

In accordance with the embodiments in FIGS. 1a, 1b, 1c and 1d, the pneumatically controllable flow-control valve 25a comprises a pneumatic control input 26a that in accordance with FIG. 1a is connected to the charging line 23, in accordance with FIG. 1b is connected to the outlet line 16, in accordance with FIG. 1c is connected to the difference pressure controller 24 and in accordance with FIG. 1d is connected to the charging line 23 and to the outlet line 16, wherein the difference pressure controller 24 outputs a difference pressure pDiff that corresponds to the difference between the charging pressure pA and the compression pressure p3.

It is consequently possible to supply to the pneumatic control input 26a the charging pressure medium A with the charging volume flow QA and at the charging pressure pA (FIG. 1a) or to supply the compression pressure medium L3 at the compression pressure p3 and with the compression volume flow Q3 (FIG. 1b) or to supply the difference pressure pDiff (FIG. 1c) or to supply both the charging pressure medium A and also the compression pressure medium L3 (FIG. 1d). Herein below, in all cases the pressure pA, p3, pDiff that is acting on the pneumatic control input 26a is referred to as the admission pressure pV and the volume flow QA, Q3 is referred to as the admission volume flow QV, in dependence upon which the pneumatically controllable flow-control valve 25a is controlled.

In accordance with FIG. 2a, the pneumatic flow-control valve 25a is constructed in such a manner that the admission volume flow QV or the admission pressure pV present at the pneumatic control input 26a moves a spring pre-stressed flow-control piston 27 in such a continuously variable manner into the flow path of the charging pressure medium A that the flow-control cross-section DQ reduces in a continuously variable manner as the admission pressure pV increases or as the admission volume flow QV increases. As a consequence, the limit volume flow QG that is determined by means of the flow-control cross-section DQ also reduces. It is thus possible to prevent charging pressure medium A from flowing into the compressor 4 with an excessively high volume flow QA.

In so doing, the movement of the flow-control piston 27 is to be adjusted in dependence upon whether the charging pressure medium A, the compression pressure medium L3 or the difference pressure pDiff is supplied to the pneumatic flow-control valve 25a via the pneumatic control input 26a, since the same limit volume flow QG is to be adjusted for different pressures p3, pA, pDiff and different volume flows Q3, QA. If a difference pressure pDiff is provided, the adjustment of the flow-control piston 27 is to be selected by way of example in such a manner that the difference pressure pDiff is held at a constant difference value WDiff. In other words, also in the case of a low charging pressure pA, only a corresponding low compression pressure p3 is generated by the multi-stage compressor 4.

In all cases, the limit volume flow QG is to be selected in such a manner that the compressor 4 is not overloaded and constantly operates just below its power limit.

Another pneumatic flow-control valve 25a is to be selected for the embodiment in FIG. 1d since both the compression pressure p3 and also the charging pressure pA are present as admission pressures pV. For this purpose, an alternative embodiment of the pneumatic flow-control valve 25a is illustrated in FIG. 2b, in which an adjustment of a limit volume flow QG is realized in dependence upon the difference pressure pDiff by virtue of the fact that the compression pressure p3 and the charging pressure pA are supplied to the pneumatic flow-control valve 25a as an admission pressure pV. The compression pressure p3 and the charging pressure pA act from different sides on a control piston 29 that is operatively connected to the flow-control piston 27 and that moves the flow-control piston 27 to a greater or lesser extent in the flow path of the charging pressure medium A depending upon the pressure difference between p3 and pA. In so doing, the control piston 29 is pre-stressed via a spring 32, in particular a compression spring, in order to support the difference pressure to pDiff and to adjust the control piston 29 in dependence thereon into the desired specific position. Consequently, the charging pressure pA or the charging volume flow QA may be limited to a greater or lesser extent depending upon the pressure difference in order to be able to hold a constant difference value WDiff.

Alternatively, in the pneumatic flow-control valve 25a in accordance with FIG. 2b, it is possible to supply the charging pressure medium A at the charging pressure pA on the one hand via the pneumatic control input 26a and in addition as indicated by the dashed line in a similar manner to FIG. 2a also from the charging line 23 directly, wherein the pneumatic connection between the control piston 29 and the flow-control piston 27 is omitted.

Figure 1E:
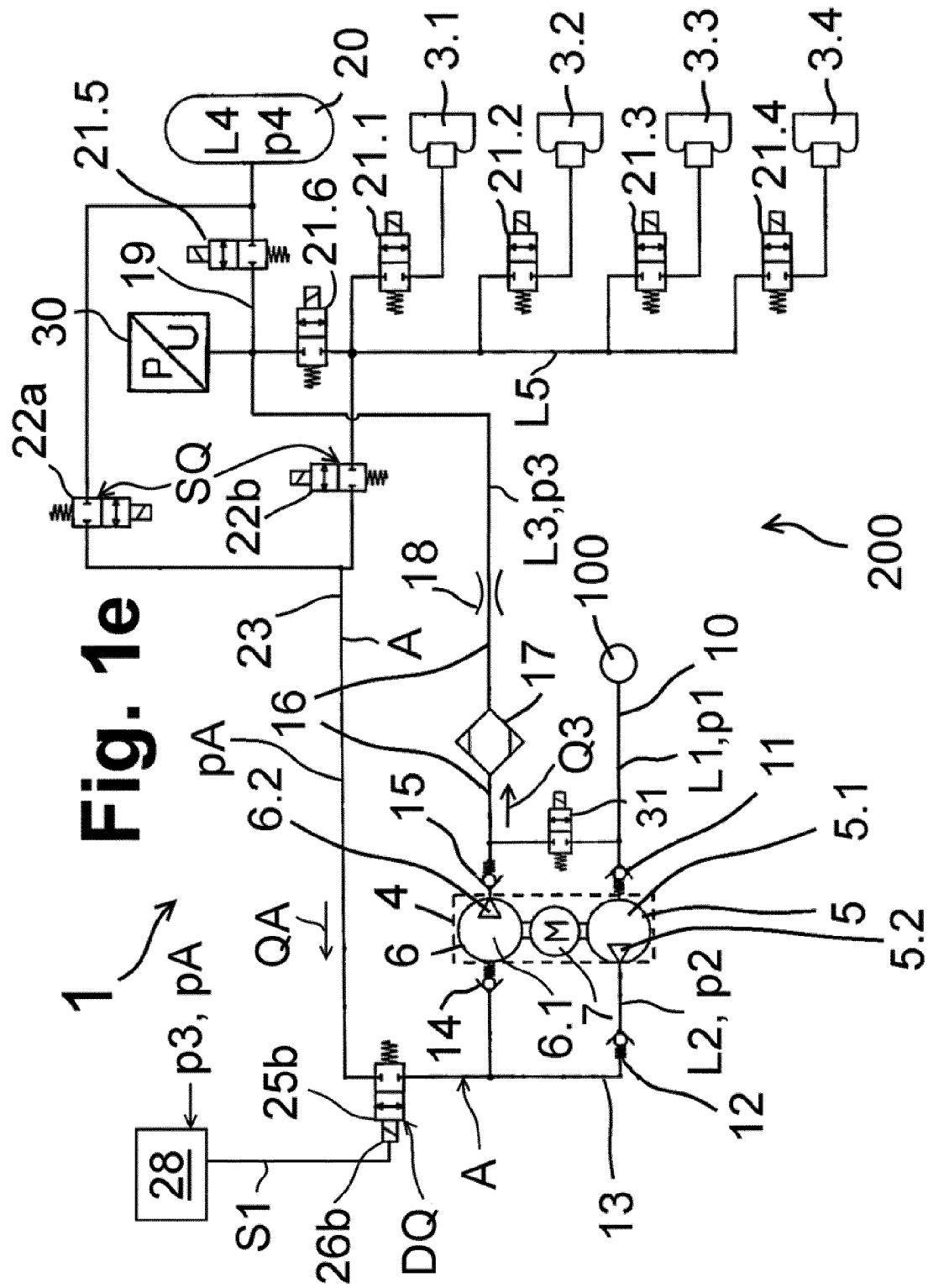

Alternatively, in accordance with the embodiment in FIG. 1e, it is also possible to provide an electrically controllable flow-control valve 25b that is controlled via an electrical control signal S1. In so doing, the electric control signal S1 is generated in a control unit 28 in dependence upon the admission pressure pV, in other words upon the charging pressure p3 and/or upon the compression pressure p3, and/or upon the admission volume flow QV, in other words upon the charging volume flow QA or upon the compression volume flow Q3 and transmitted to the in this case electrical control input 26b of the electrical flow-control valve 25b. In so doing, it is also possible to perform a control procedure in dependence upon the difference pressure pDiff between the charging pressure pA and the compression pressure p3 that is determined in this case by way of example in the control unit 28.

The electrical flow-control valve 25b is configured in accordance with the embodiment in FIG. 1e as a 2/2-way control valve that may be switched in two switching positions X1, X2, wherein the switching position X1, X2 that is to be set is predetermined by means of the control signal S1 and in the case of a corresponding control procedure a flow control may be ensured. The electrical flow-control valve 25b is closed in a first switching position X1 and open in a second switching position X2.

In the case of a permanently set first switching position X1, the electrical flow-control valve 25b provides a minimum flow-control cross-section DQ_min of 0 mm since flow through the closed electrical flow-control valve 25b is completely prevented. In the case of a permanently set second switching position X2, the electrical flow-control valve 25b is fully open and a maximum flow-control cross-section DQ_max is set that corresponds to a cross-section of the open 2/2-way control valve. Flow through the electrical flow-control valve 25b is consequently possible and in the case of a continuously set second switching position X2 the charging volume flow QA is limited to a limit volume flow QG that is provided by means of the maximum flow-control cross-section DQ_max. If the maximum flow-control cross-section DQ_max is equal to the switching cross-section SQ of the switching valves 22a, 22b, the charging volume flow QA is not adjusted. Only losses may slightly reduce this.

In order with this construction to also render possible a continuously variable adjustment of the limit volume flow QG, a continuously variable adjustment of the flow-control cross-section DQ is required. This may be realized by means of a pulse-width modulated control procedure of the electrical flow-control valve 25b. For this purpose, the electrical flow-control valve 25b is switched by the control unit 28 via the control signal S1 in an alternating manner between the first and the second switching position X1, X2. The signal progression is illustrated by way of example in FIG. 3. In dependence upon a pulse time period t1, in which the second switching position X2 is set, and a pause time period t2, in which the first switching position X1 is set, over the time period t a pulsating flow-control cross-section DQ is produced that owing to the short switching time periods t1, t2 does not achieve the minimum flow-control cross-section DQ_min of 0 mm in the first switching position X1 and does not achieve the maximum flow-control cross-section DQ_max of 4 mm in the second switching position X2.

Furthermore, it is possible in an electrically controlled continuously variable manner to adjust an average flow-control cross-section DQ_avg that acts in the middle on the charging pressure medium A and by means of which it is possible to adjust the limit volume flow QG in a continuously variable manner. If the pulse time period t1 is selected to be greater than the pause time period t2, overall a higher average flow-control cross-section DQ_avg is provided. If the pause time period t2 is selected to be greater than the pulse time period t1, it is possible to adjust a lower average flow-control cross-section DQ_avg.

Alternatively, it is also possible to use the switching valves 22a, 22b directly as electrically controlled flow-control valves 25b. If the pressure control system 1 is switched into the closed operating mode BMc, the corresponding switching valve 22a, 22b is controlled in a pulse-width modulated manner by the control signal S1 with the result that the corresponding charging pressure medium A is released at the beginning with a limited volume flow. A corresponding logic is then integrated in the control unit 28, said logic only then allowing an admission pressure-dependent or volume-flow-dependent control of the switching valves 22a, 22b as electrical flow-control valve 25b if the closed operating mode BMc has been activated.

The admission pressure pV or rather the admission volume flow QV are used in all the embodiments as a measure for a prevailing (p3 as admission pressure pV; Q3 as an admission volume flow QV) or rather for a currently to be expected (pA as admission pressure pV; QA as admission volume flow QV) loading of the multi-stage compressor 4 as a pneumatic consumer in the pressure control system 1. The difference pressure pDiff also indicates the extent to which the respective active compression stage 5, 6 is operating in order to generate this difference pressure pDiff between the in-flowing pressure medium, in this case the charging pressure medium A, and the out-flowing pressure medium, in this case the compression pressure medium L3. In dependence thereon, the flow-control cross-section DQ or rather the average flow-control cross-section DQ_avg is adjusted in a continuously variable manner in the respective flow-control valve 25a, 25b in order to limit the charging volume flow QA and consequently to operate the compressor 4 below the power limit.

Consequently, it is possible by means of the different embodiments to limit the volume flow to the limit volume flow QG in an admission pressure-dependent or volume-flow-dependent continuously variable manner in order to avoid an overloading of the multi-stage compressor 4. As a consequence, it is possible in the closed operating mode BMc to limit the power with which the energy requirement of the compressor 4 may be adjusted in a variable manner. The required power consumption of the motor 7 of the compressor 4 is consequently limited, since a limited compression work is to be performed. This may be used so as to optimize the multi-stage compressor with the result that in particular the compression volume flow Q3 may be adjusted in an optimum manner from the second compression stage 6.

Figure 4:
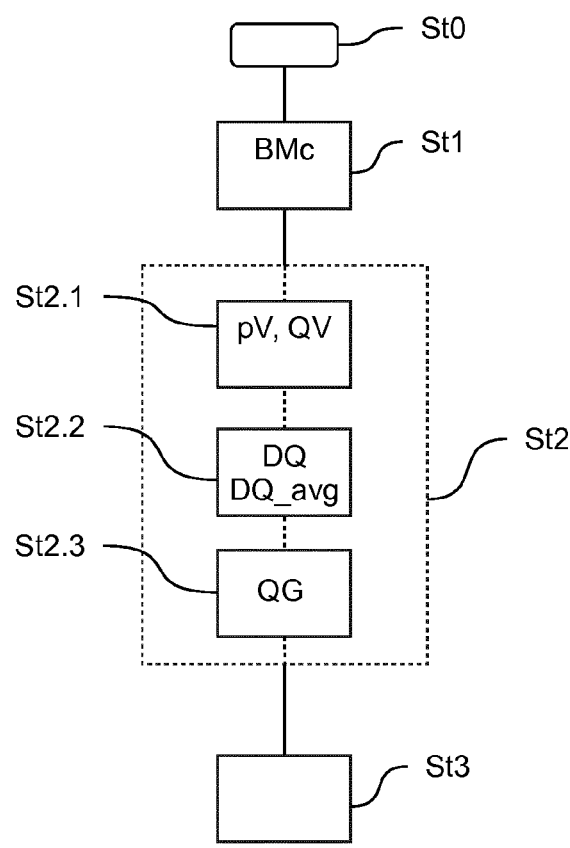
FIG. 4 illustrates a flow diagram of a method according to the invention.

In accordance with FIG. 4, a method according to the invention can be performed as follows:

In an initial step St0, the pressure control system 1 is initialized. Subsequently, a check is performed in a first step St1 as to whether the closed operating mode BMc is set. If this is the case, the charging pressure medium A flows through the charging line A and the multi-state compressor 4 compresses this charging pressure medium A in at least one of the compression stages 5, 6 again. A compressed pressure medium L3 is released from the multi-stage compressor 4 into the outlet line 16.

In order to limit the power of the multi-stage compressor 4 as the further compression procedure is performed, a continuously variable adjustment of the charging volume flow QA is made in a second step St2. For this purpose, a flow-control valve 25a, 25b in the charging line 23 is controlled in a first part step St2.1 in an admission pressure-dependent pV or admission volume flow-dependent manner. The admission pressure pV may in so doing be the charging pressure pA, the compression pressure p3 or the difference pressure pDiff. The admission volume flow QV is predetermined by means of the charging volume flow QA or by means of the compression volume flow Q3.

It is possible to perform the control procedure in an electrical or pneumatic manner, in other words either the pneumatic control input 26a of the pneumatic flow-control valve 25a is controlled with the corresponding admission pressure pV and/or the admission volume flow QV or the electrical control input 26b of the electrical flow-control valve 25b is controlled by the control signal S1 that is generated in dependence upon the admission pressure pV or upon the admission volume flow QV.

In a second part step St2.2, in dependence upon the admission pressure pV and/or the admission volume flow QV, a flow-control cross-section DQ is adjusted in the pneumatic flow-control valve 25a and an average flow-control cross-section DQ_avg is adjusted in the electrical flow-control valve 25b. This occurs in the pneumatic flow-control valve 25a via a flow-control piston 27 and in the electrical flow-control valve 25b this occurs via a pulse-width modulated control procedure via the control signal S1.

As a consequence, in a third part step St2.3, a limit volume flow QG is set, to which the charging volume flow QA is limited if the charging pressure medium A flows through the corresponding flow-control valve 25a, 25b in the closed operating mode BMc. As a consequence, in a third step St3, a volume-flow-limited QG charging pressure medium A is directed into the intermediate volume 13 or into any other compression stage 5, 6 of the multi-stage compressor 4 for further compression by the multi-stage compressor 4 without exceeding the power limit.

While the invention has been illustrated and described in detail in the drawings and foregoing description, such illustration and description are to be considered illustrative or exemplary and not restrictive. It will be understood that changes and modifications may be made by those of ordinary skill within the scope of the following claims. In particular, the present invention covers further embodiments with any combination of features from different embodiments described above and below.

The terms used in the claims should be construed to have the broadest reasonable interpretation consistent with the foregoing description. For example, the use of the article "a"

or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

LIST OF REFERENCE NUMERALS

1 Air spring system
3.i Pressure medium chambers
4 Two-stage compressor
5 First compression stage
5.1 First intake chamber
5.2 First compression chamber
6 Second compression stage
6.1 Second intake chamber
6.2 Second compression chamber
7 Motor
10 Intake line
11 First inlet valve
12 First outlet valve
13 Intermediate volume
14 Second inlet valve
15 Second outlet valve
16 Outlet line
17 Air dryer
18 Nozzle
19 Storage device line
20 Pressure medium storage device
21.i Controllable valves
22a First switching valve
22b Second switching valve
23 Charging line
24 Difference pressure controller
25a Pneumatic controllable flow-control valve
25b Electrically controllable flow-control valve
26a Pneumatic control input
26b Electrical control input
27 Flow-control piston
28 Control unit
29 Control piston
30 Pressure measuring device
31 Discharge valve
32 Spring
100 Atmosphere
200 Vehicle
A Charging pressure medium
BMo Open operating mode
BMc Closed operating mode
DQ Flow-control cross-section
DQ_avg Average flow-control cross-section
DQ_max Maximum flow-control cross-section
DQ_min Minimum flow-control cross-section
L1 Intake air
L2 Pre-compressed air
L3 Compressed air
L4 Stored air
L5 Chamber air
p1 Air pressure/intake pressure
p2 Intermediate pressure
p3 Compression pressure
p4 Storage pressure
PA Charging pressure
pDiff Difference pressure
pV Admission pressure
Q3 Compression volume flow
QA Charging volume flow
QG Limit volume flow
QV Admission volume flow
S1 Control signal
SQ Switching valve cross-section
t Time period
t1 Pulse time period
t2 Pause time period
WDiff Difference value
X1 First switching position
X2 Second switching position

The invention claimed is:

1. A method for operating a pressure control system in a vehicle, the method comprising:
controlling a flow-control valve in a charging line, which conveys a charging pressure medium, in dependence upon an admission pressure and/or upon an admission volume flow, wherein the admission pressure and/or the admission volume flow characterizes a prevailing or currently to be expected loading of a pneumatic consumer of the pressure control system during the supply of the charging pressure medium with a charging volume flow and at a charging pressure into the pneumatic consumer;
adjusting a flow-control cross-section, which acts on the charging pressure medium as it flows through the flow-control valve, or adjusting an average flow-control cross-section so as to limit the charging volume flow to a limit volume flow, wherein the flow-control cross-section or the average flow-control cross-section is adjusted in a continuously variable manner in dependence upon the admission pressure and/or upon the admission volume flow; and
outputting the volume-flow limited charging pressure medium to the pneumatic consumer,
wherein the flow-control valve is controlled pneumatically, wherein for this purpose the pneumatically controlled flow-control valve is controlled via a pneumatic control input at the admission pressure and/or with the admission volume flow, and the pneumatic flow-control valve changes its flow-control cross-section in a continuously variable manner in dependence upon the pneumatically supplied admission pressure and/or the admission volume flow so as to limit in a continuously variable manner the charging volume flow to the limit volume flow,
wherein the admission pressure is predetermined by the charging pressure of the charging pressure medium and/or by a compression pressure of a compressed pressure medium flowing out of the pneumatic consumer or by a difference pressure between the charging pressure and the compression pressure, and
wherein the admission volume flow is predetermined by the charging volume flow of the charging pressure medium and/or by a compression volume flow of the compressed pressure medium flowing out of the pneumatic consumer.

2. The method as claimed in claim 1, wherein the flow-control cross-section or the average flow-control cross-section of the respective flow-control valve is adjusted such that the difference pressure is held at a constant difference value.

3. The method as claimed in claim 1, wherein the flow-control cross-section or the average flow-control cross-section of the respective flow-control valve is adjusted in a continuously variable manner such that in case of an increasing charging pressure and/or charging volume flow or increasing compression pressure and/or compression volume flow the flow-control cross-section or the average flow-control cross-section are reduced in a continuously variable manner so as to limit the power consumption of the pneumatic consumer in a continuously variable manner.

4. A pressure control system, the pressure control system comprising:
- a single-stage or multi-stage compressor as a pneumatic consumer, wherein the single-stage or multi-stage compressor comprises at least one compression stage so as to provide a compressed pressure medium,
- wherein at least one pressure medium chamber configured to be flow-connected to the compression stage and/or a pressure medium storage device configured to be flow-connected to at least one of the compression stages is provided so as to store the compressed pressure medium, and
- a charging line that connects the pressure medium storage device and/or the at least one pressure medium chamber to at least one of the compression stages so as to convey a pressure medium that is stored in the pressure medium storage device or a chamber pressure medium that is used in the pressure medium chambers as a charging pressure medium into at least one of the compression stages of the single-stage or multi-stage compressor,
- wherein a pneumatically controlled flow-control valve is arranged in the charging line,
- wherein the flow-control cross-section or the average flow-control cross-section of the respective flow-control valve is configured to be adjusted in a continuously variable manner in a pneumatically controlled manner so as to limit the charging volume flow of the charging pressure medium to the limit volume flow in a continuously variable manner, and
- wherein the pneumatically controlled flow-control valve is connected via a pneumatic control input to the charging line and/or to an outlet line configured to convey the compressed pressure medium or to a difference pressure controller so as to predetermine a corresponding admission pressure and/or admission volume flow, wherein a difference pressure controller outputs as an admission pressure a difference pressure between the charging pressure and the compression pressure.

5. The pressure control system as claimed in claim 4, wherein the pressure control system is an air spring system.

6. The pressure control system as claimed in claim 4, wherein the flow-control cross-section is configured to be adjusted via a flow-control piston that is configured to be actuated pneumatically in dependence upon the admission pressure and/or upon the admission volume flow.

7. The pressure control system as claimed in claim 6, wherein the flow-control piston is operatively connected to a control piston, wherein the control piston is configured to be adjusted in dependence upon the charging pressure and upon the compression pressure as an admission pressure such that the flow-control cross-section is configured to be adjusted via the flow-control piston in dependence upon the difference pressure between the charging pressure and the compression pressure.

8. A vehicle having a pressure control system as claimed in claim 4.

* * * * *